United States Patent [19]

Berner et al.

[11] 3,913,388

[45] Oct. 21, 1975

[54] APPARATUS FOR ULTRASONIC TESTING OF METALLIC SHEETS OR THE LIKE

[75] Inventors: Klaus Berner, Salzgitter-Lebenstedt; Jorg Kügler, Wolfenbuttel; Hans-Günther Grote, Salzgitter-Lobmachtersen, all of Germany

[73] Assignee: Stahlwerke Peine-Salzgitter Aktiengesellschaft, Peine, Germany

[22] Filed: July 18, 1974

[21] Appl. No.: 489,950

[30] Foreign Application Priority Data

July 27, 1973 Germany.......................... 2338163

[52] U.S. Cl. ............................................. 73/67.8 S
[51] Int. Cl.² ........................................... G01N 29/04
[58] Field of Search............ 73/67.8 R, 67.8 S, 67.9, 73/71.5 (U.S.)

[56] References Cited
UNITED STATES PATENTS

| | | | |
|---|---|---|---|
| 2,989,864 | 6/1961 | Bamford........................... | 73/67.8 S |
| 3,209,582 | 10/1965 | Greenberg et al................ | 73/67.8 S |
| 3,553,570 | 1/1971 | Skubiak et al.................... | 73/67.8 S X |
| 3,670,562 | 6/1972 | Muto et al. ...................... | 73/67.8 X |

FOREIGN PATENTS OR APPLICATIONS

| | | | |
|---|---|---|---|
| 1,070,962 | 6/1967 | United Kingdom ...... | 73/71.5 (U.S.) |
| 21,517 | 6/1971 | Japan............................ | 73/67.8 S |

*Primary Examiner*—Richard C. Queisser
*Assistant Examiner*—John P. Beauchamp
*Attorney, Agent, or Firm*—Michael S. Striker

[57] ABSTRACT

An ultrasonic testing apparatus for metallic sheets or bands which are transported in a horizontal path has a carriage which is movable transversely of the path at a level above the sheets or bands and directly or indirectly carries a preferably trough-shaped support for oscillating means and the testing devices. The entire support or the rear portion of the support is movable up or down by a pneumatic cylinder and piston unit and supports a detachable carrier for several parallel motion mechanisms each of which supports a probe holder and is biased by a spring to urge the probe against the sheet or band when the cylinder and piston unit is extended. The carrier is oscillated by a motor which is mounted on the support and transmits motion to the carrier by way of a crank drive. The crank drive can include balancing weights or the motor on the support can reciprocate a balancing weight through the medium of a second crank drive.

37 Claims, 10 Drawing Figures

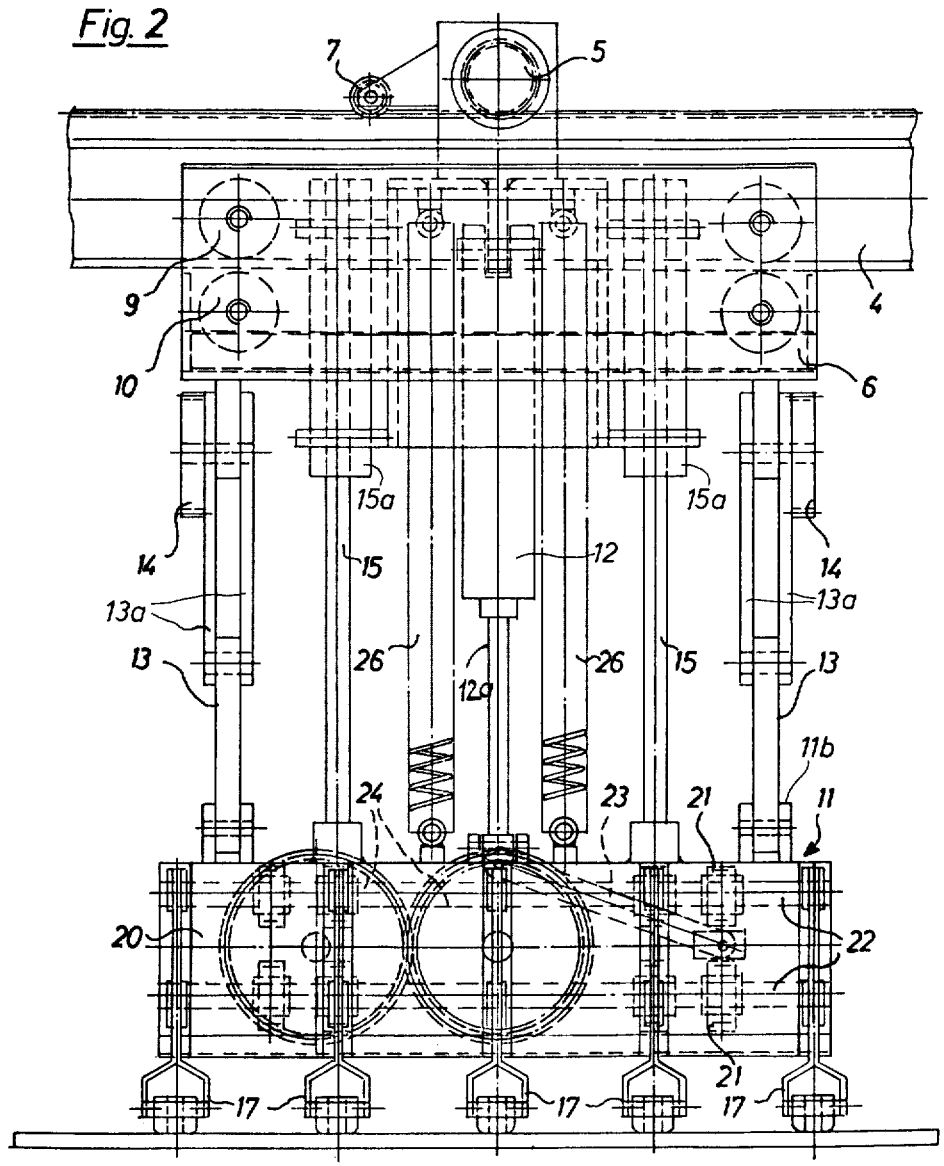

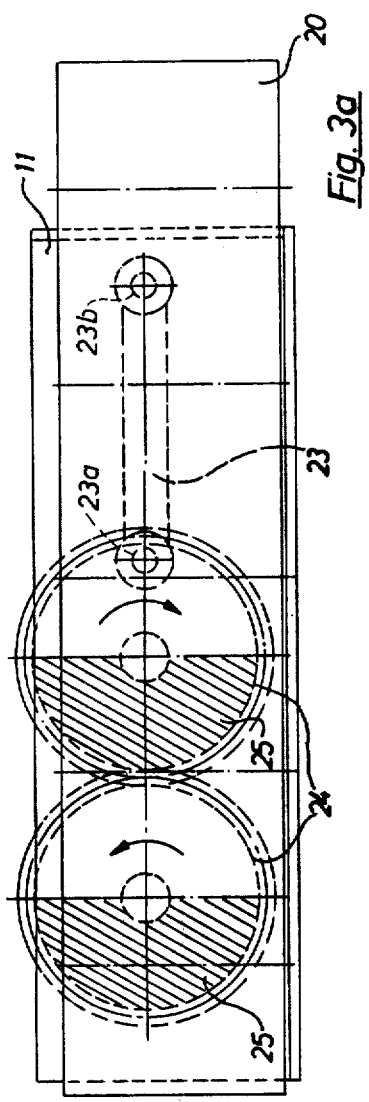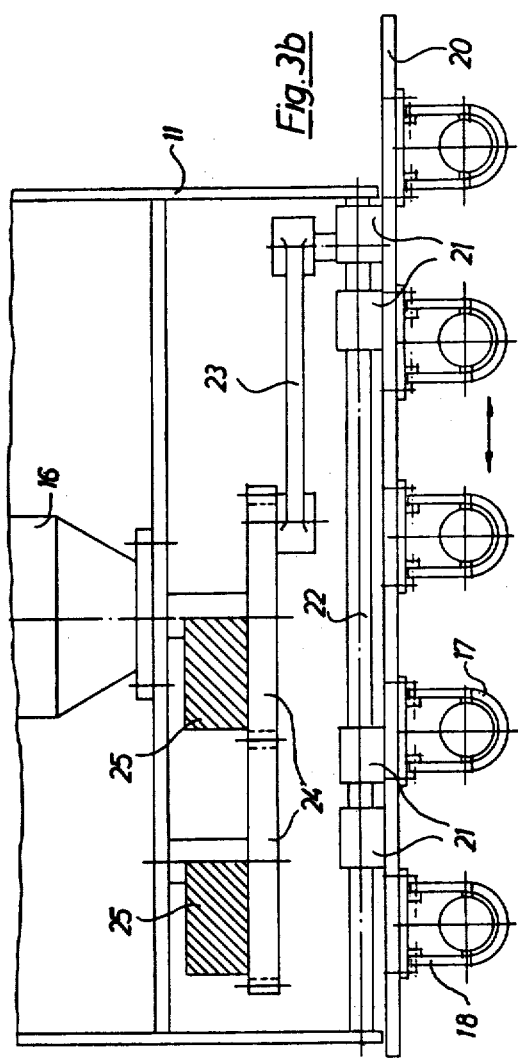

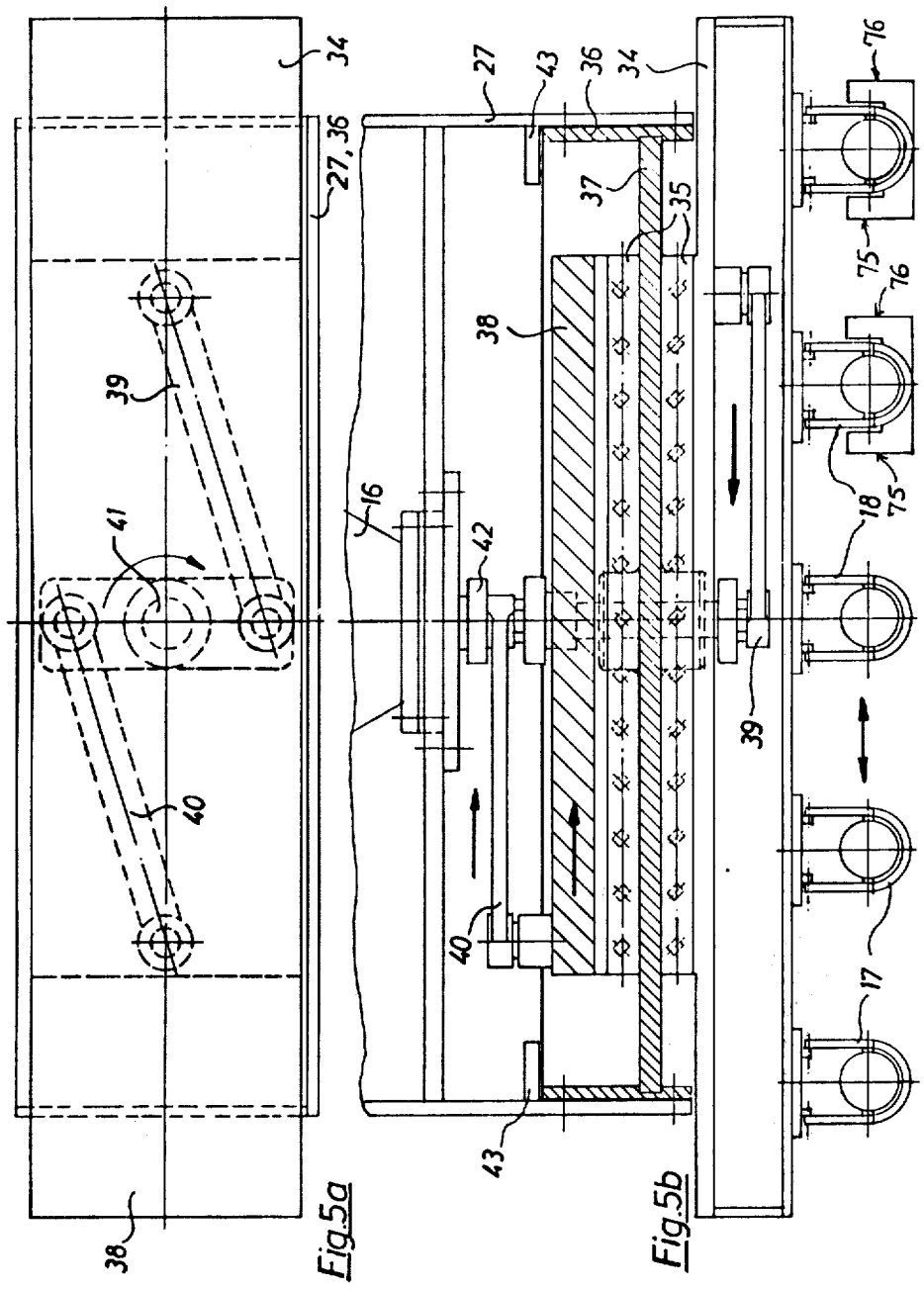

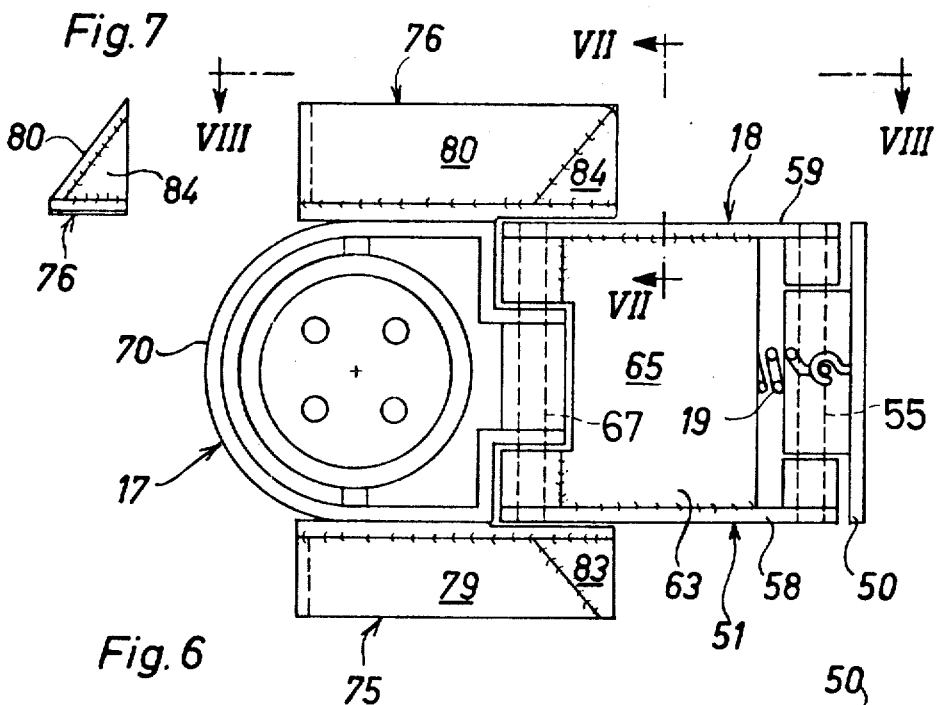
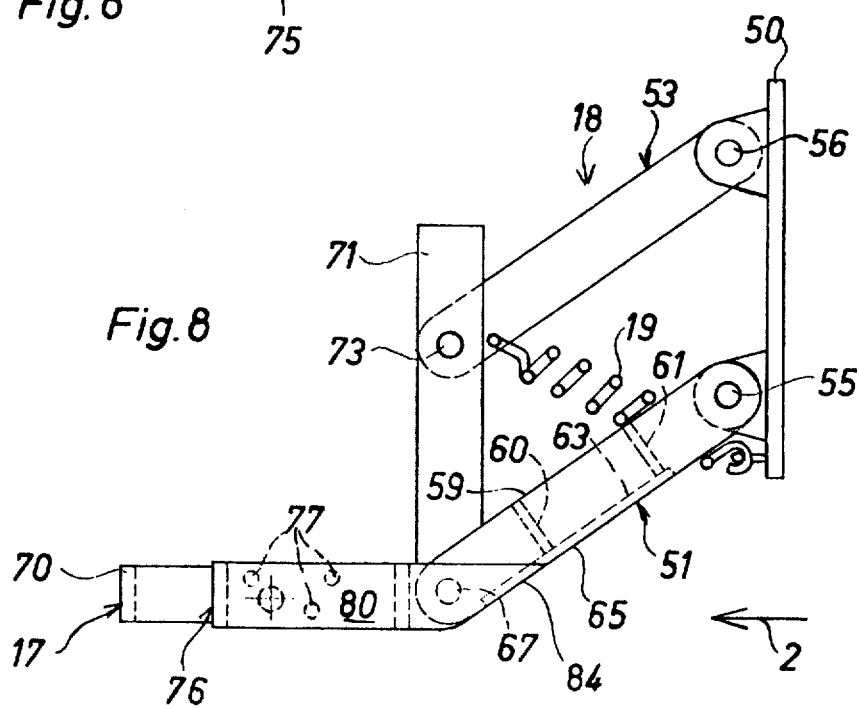

3,913,388

APPARATUS FOR ULTRASONIC TESTING OF METALLIC SHEETS OR THE LIKE

BACKGROUND OF THE INVENTION

The present invention relates to improvements in apparatus for ultrasonic non-destructive testing of workpieces, especially for testing of metallic sheets, webs, bands, strips or analogous elongated commodities.

It is already known to utilize in an ultrasonic sheet testing apparatus a carriage which is movable transversely of the path of workpieces and supports one or more parallel motion mechanisms each of which carries a testing head or probe which is biased against or toward the adjacent side of a moving workpiece. In order to insure that the probe will scan a relatively large area of the workpiece, the parallel motion mechanism for the probe is oscillated back and forth transversely of the path wherein the workpieces are conveyed lengthwise past the testing station. To this end, the carriage is driven by a reversible motor or the like so that it moves the parallel motion mechanism(s) and the probe(s) with respect to the workpieces. Such mode of oscillating the probe or probes exhibits a number of drawbacks. Thus, the mass of the carriage is substantial (especially if the carriage must support several parallel motion mechanisms) so that the energy requirements of the means for oscillating the carriage are high. Moreover, the inertia of carriage and of the parts which are mounted thereon prevents or opposes a high-frequency oscillation so that the workpieces cannot be conveyed at a high speed and the output of the testing apparatus is low. Furthermore, the wear on bearings, guides and moving parts is very high so that the apparatus must be inspected at frequent intervals in order to insure timely detection of defective components. It has been found that such apparatus cannot be used to test sheets or analogous workpieces at the rate at which the sheets are produced in a manufacturing plant or advanced in a processing plant, e.g., in a factory where the sheets are converted into tubes.

Such and other similar apparatus are described for example in German Anslegeschrift No. 1 060 626, German Offenlegungsschrift No. 2 021 278 or German Pat. No. 2 021 279, or in the technical journal Bunder Bleche Rohre 13(1972), p. 583–586.

SUMMARY OF THE INVENTION

An object of the invention is to provide an apparatus for ultrasonic testing of sheets, bands or analogous workpieces, which can scan rapidly moving workpieces, whose energy requirements are low, wherein the moving parts are not subjected to pronounced wear, and which can be used for testing of a variety of workpieces with a high degree of reliability and reproducibility.

Another object of the invention is to provide a novel and improved mounting for one or more probes in an ultrasonic testing apparatus for sheets, bands or the like.

A further object of the invention is to provide novel and improved means for effecting and controlling the movements of one or more probes in an ultrasonic sheet testing apparatus.

An additional object of the invention is to provide an ultrasonic testing apparatus whose units are constructed in the form of modules so as to facilitate the assembly, dismantling, inspection, detection of malfunctions, conversion for different types of testing operations and/or conversion for testing of different types of workpieces.

The invention is embodied in an apparatus for ultrasonic testing of elongated metallic sheets, bands or analogous workpieces which are transported lengthwise in a predetermined direction along a predetermined path. The apparatus comprises a frame, a carriage which is mounted in and is movable by a motor relative to the frame transversely of the path and preferably at a level above the workpieces, a preferably trough-shaped support, a displacing device (preferably a pneumatically operated cylinder and piston assembly) connecting the carriage with the support and serving to move at least a portion of the support toward and away from the path for workpieces, at least one linkage (preferably a parallel motion mechanism) movably mounted on the support, a probe holder mounted on the linkage, and means for oscillating the linkage and the probe with respect to the support substantially transversely of the path for workpieces.

The displacing means can move the aforementioned portion of (or the entire) support to and from a predetermined operative position in which the probe or probes are immediately adjacent to the path for workpieces, and the apparatus preferebly further comprises means for biasing the linkage or linkages so as to yieldably urge the probe or probes against a workpiece in the path in the operative position of the support. The latter may further constitute a deflector which is closely adjacent to the path for workpieces when it assumes the aforementioned operative position so that it can be engaged by eventual protuberances of a workpiece and to thus shield the probe or probes against excessive stresses.

The novel features which are considered as characteristic for the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a front elevational view of the testing apparatus, as seen from the right-hand side of FIG. 1;

FIG. 3a is an enlarged front elevational view of the carrier for parallel motion mechanisms, substantially as seen in the direction of arrow III in FIG. 1;

FIG. 3b is a plan view of the structure shown in FIG. 3a, further showing the parallel motion mechanisms and the probes;

FIG. 5a is a front elevational view of the carrier as seen in the direction of arrow V in FIG. 4, with the parallel motion mechanisms and probes omitted;

FIG. 5b is a plan view of the structure shown in FIG. 5a, with certain parts illustrated in horizontal section and further showing the parallel motion mechanisms and the probes;

FIG. 6 is a bottom plan view of a parallel motion mechanism;

FIG. 7 is a fragmentary sectional view as seen in the direction of arrows from the line VII—VII of FIG. 6; and FIG. 8 is a side elevational view of the parallel motion mechanism, substantially as seen in the direction of arrows from the line VIII—VIII of FIG. 6.

DESCRIPTION OF THE PREFERRED EMBODIMENTS

Figure 1:
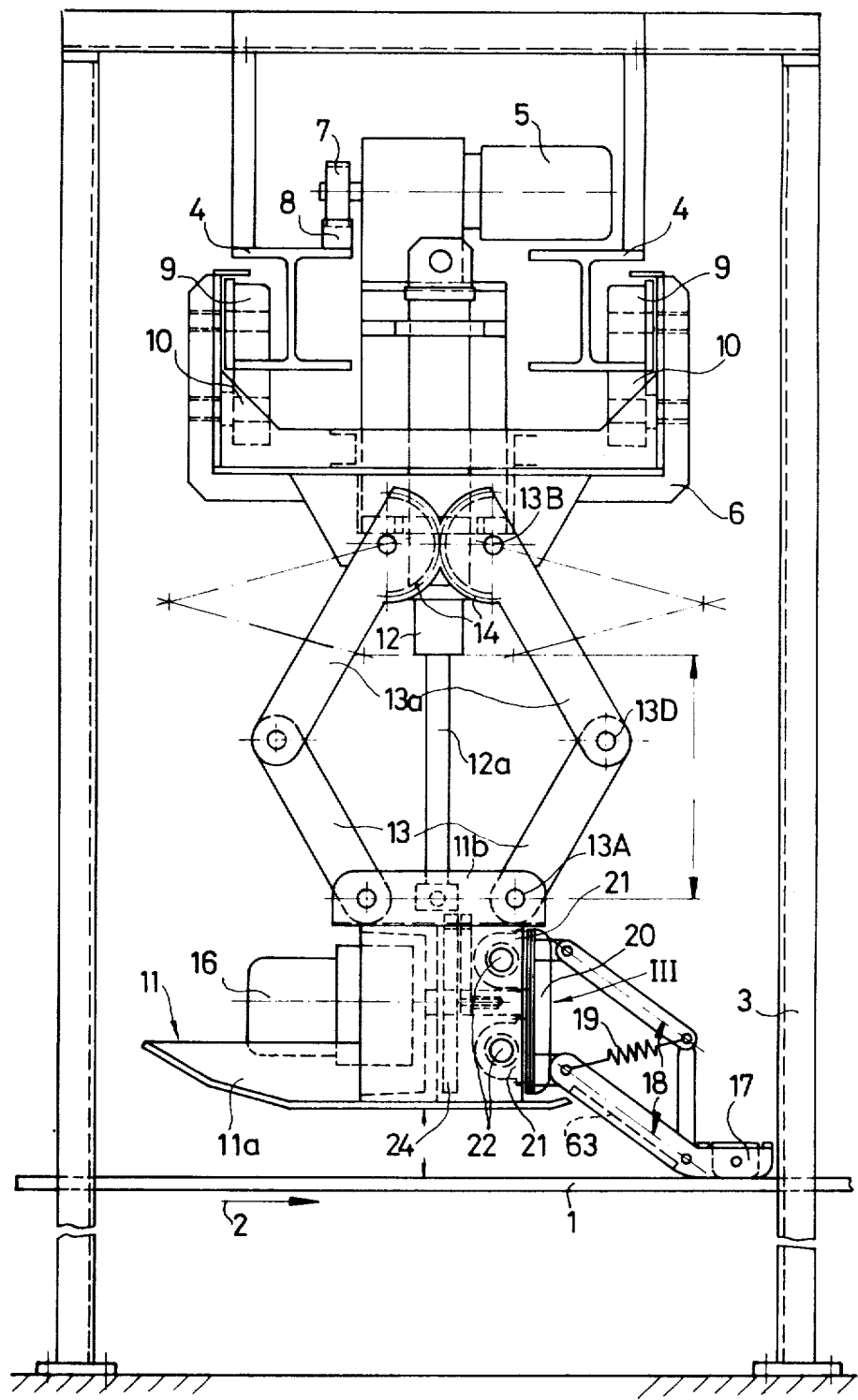
FIG. 1 is a schematic side elevational view of an ultrasonic testing apparatus wherein the carrier for parallel motion mechanisms and probes is reciprocable toward and away from the path of the workpieces.

Referring first to FIGS. 1, 2, 3a and 3b, there is shown an apparatus for ultrasonic testing of metallic plates, sheets or bands 1 which are moved in the direction indicated by arrow 2 (FIG. 1). The apparatus comprises a frame or housing 3 which supports two horizontal I-bars 4 serving as a guide means or tracks for a carriage or dolly 6. The bars 4 extend at right angles to the direction of lengthwise movement of a sheet 1 and their lower outer flanges are flanked by pairs of rollers or wheels 9, 10 which are mounted on the carriage 6. The latter supports an electric motor 5 whose output element drives a pinion 7 in mesh with a toothed rack 8 on one of the bars 4. Thus, when the motor 5 is on, the parts 7, 8 cooperate to move the carriage 6 in a direction to the right or left, as viewed in FIG. 2 (i.e., toward or away from the observer of FIG. 1) so as to place the carriage into a predetermined position with respect to the two marginal portions of a sheet 1 which is transported therebelow along a horizontal path by a conveyor system which is known and therefore not shown in the drawing. As a rule, the motor 5 will be started by attendants in order to position the carriage 6 midway between the two parallel marginal portions of a sheet 1. The testing apparatus may include a system which monitors the position of the carriage 6 and automatically arrests the motor 5 when the carriage assumes the desired position, i.e., normally that position in which it is located centrally of the path for the material to be tested. The stoppage of motor 5 can result in automatic application of one or more brakes, not shown, which remain operative while the motor 5 is idle to thus insure that the carriage 6 cannot leave the selected position. The brake or brakes may be applied to all, some or one of the wheels 9, 10.

The carriage 6 supports a vertically movable trough-shaped support 11. The support 11 also performs the function of a deflector or guide and, to that end, includes a follower portion or ramp 11a having an underside which slopes upwardly counter to the direction of movement of sheets 1 (see the arrow 2) and causes the upwardly extending leader of a sheet 1 to remain in its path, i.e., to pass below the support 11. The ramp 11a can also detect upwardly extending intermediate portions or humps of a sheet 1.

The means for moving the support 11 up and down with respect to the carriage 6 comprises a fluid-operated cylinder-and-piston unit or jack having a double-acting cylinder 12 which is secured to the carriage, a piston (not shown) in the cylinder 12, and a piston rod 12a which is secured to the piston at its upper end and to a crosshead 11b of the support 11 at its lower end. The support 11 is held against tilting relative to the carriage 6 by two toggle mechanisms each including a pair of lower arms 13 which are articulately connected to the crosshead 11b (as at 13A) and two pairs of upper arms 13a which are articulately connected to the carriage 6 (as at 13B) and to the respective lower arms 13 (as at 13D). The upper end portions of the arms 13a carry mating gears here shown as segments 14 which insure that, when the piston rod 12a is caused to move up or down, the angle between the left-hand arms 13, 13a (as viewed in FIG. 1) varies to the same extent as the angle between the right-hand arms 13, 13a so that the inclination of the support 11 relative to the carriage 6 and relative to the path for the sheets 1 remains unchanged.

The support 11 is further held against tilting by two or more vertical guide rods 15 (FIG. 2) which are reciprocable in sleeves 15a secured to the carriage 6.

The support 11 constitutes a holder for an electric motor 16 which forms part of a means for oscillating one or more ultrasonic testing devices or probe holders 17 (FIG. 2 shows five probe holders 17 which are equally spaced from each other and form a row extending at right angles to the direction of lengthwise movement of sheets 1). Each of the probe holders 17 is mounted on a discrete deformable linkage in the form of a parallel motion mechanism 18 which is stressed by a helical spring 19 or analogous means for biasing the respective probe holder 17 against the upper side of a sheet 1 therebelow. The parallel motion mechanisms 18 are mounted on a vertical front plate or carrier 20 which is separably secured to the support 11. The plate 20 is movable relative to the support 11 in direction at right angles to the direction of lengthwise movement of sheets 1 (arrow 2). As shown, the plate 20 carries several or part sleeves 21 which are slidable along horizontal tie rods 22 on the support 11. FIG. 1 illustrates that the plate 20 may constitute a closure for the front end of the support 11, as considered in the direction of arrow 2.

The motor 16 can oscillate the plate 20 with the parallel motion mechanisms 18 and probe holders 17 by way of an eccentric crank drive (see particularly FIGS. 3a and 3b) which comprises at least two mating gears 24. The gears 24 carry balancing weights 25 which are positioned thereon in such a way that they neutralize all horizontal components of forces, of vice verse oscillating probe holders and all vertical components of forces of their own i.e., those forces which are normal to the path of sheets 1. As shown in FIG. 3b the output member of the motor 16 drives the right-hand gear 24 which is provided with an eccentric pin 23a (FIG. 3a) attached to one end of a connecting rod 23 the other end of which is attached to the plate 20 by a further pin 23b. The left-hand gear 24 may but need not be drivingly connected with the plate 20. When the motor 16 is on, the probe holders 17 move back and forth at right angles to the direction of lengthwise movement of a sheet 1 therebelow so that each probe can monitor a relatively large area of the sheet for the purpose of detecting one or more types of flaws in a manner well known from the art of non-destructive testing.

Figure 4:
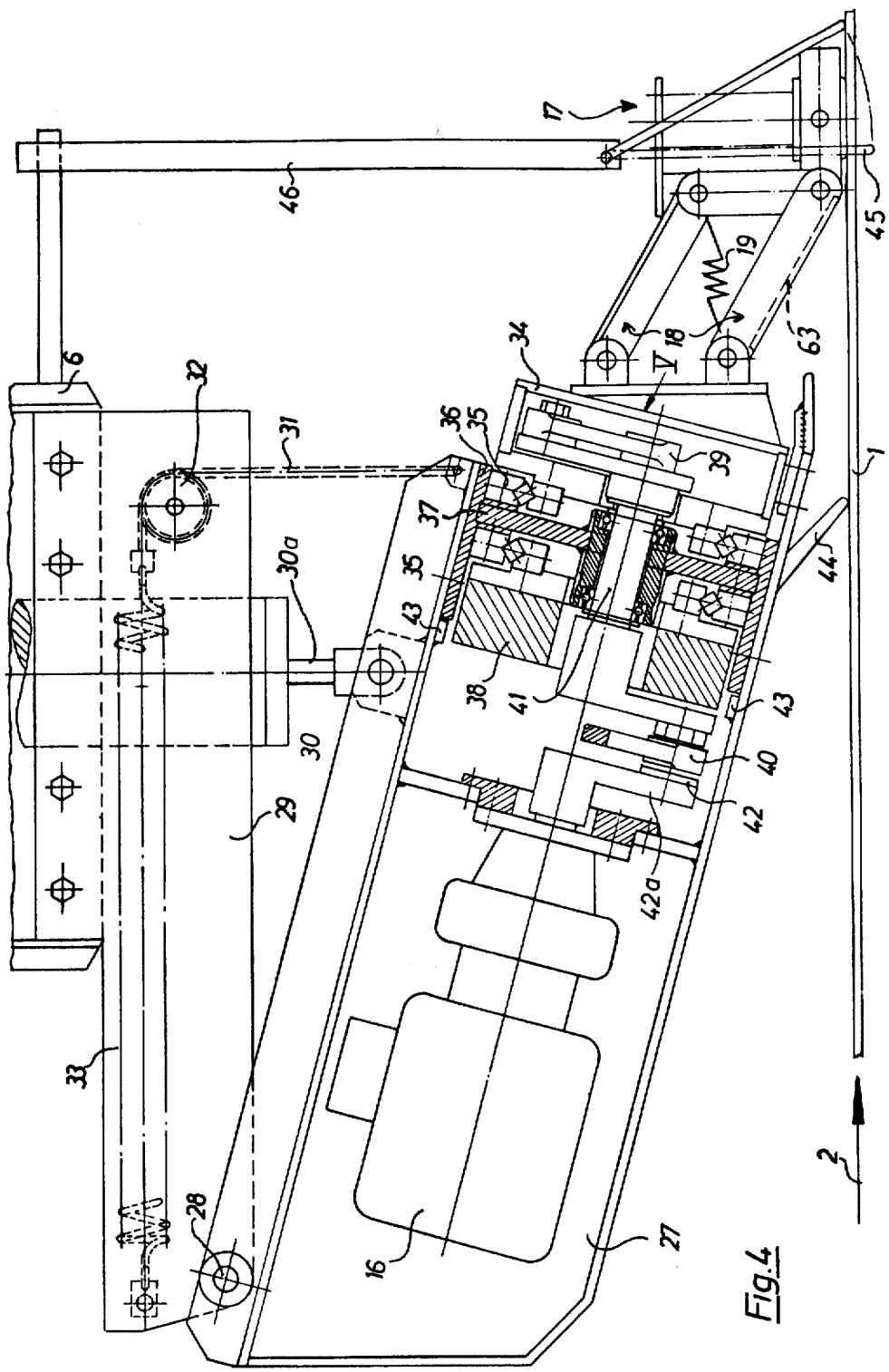
FIG. 4 is a fragmentary partly elevational and partly vertical sectional view of a second testing apparatus wherein the carrier for parallel motion mechanisms and probes is pivotable toward and away from the path for the workpieces.

The testing apparatus further comprises suitable detectors which monitor the path for sheets 1 and one of which detects the leader of an oncoming sheet 1. This detector then produces a signal which causes the jack including the cylinder 12 to lower the support 11 to an operative position. A second detector produces a signal in response to detection of the trailing end of a sheet 1 and causes the cylinder 12 to lift the support 11 with probe holders 17 to a raised or inoperative position. Detectors which can be used in the apparatus of FIGS. 1–3b are shown in FIG. 4.

The probe holders 17 are separably secured to the respective parallel motion mechanisms 18 and/or the mechanisms 18 are separably secured to the plate 20 so that each defective probe holder can be readily replaced with a satisfactory probe holder, that the apparatus can be equipped with different types of probe holders, and/or that the number of probes can be reduced or increased. The couplant (e.g., water) which is used for testing is fed to the probe holders 17 through their mounting means and, after having passed through the gaps between the probes and the upper side of a moving sheet 1 therebelow, the couplant is sucked up and/or blown away.

FIG. 2 further shows two strong helical retracting springs 26 which are attached to the carriage 6 and tend to move the support 11 upwardly to its inoperative position. These springs serve to automatically lift the support 11 and the probe holders 17 in the event of malfunctioning of the jack, e.g., in the event of failure of valve means which connects the cylinder 12 with a source of pressurized hydraulic or pneumatic fluid. The provision of retracting springs 26 constitutes a safety measure in that the springs reduce the likelihood of damage to the probes and afford access to the path for sheets 1 when the apparatus is not in use.

An important advantage of the improved testing apparatus is that the carriage 6 with its motor 5 and jack 12, 12a constitutes a first subassembly or module, that the support 11 with motor 16 and plate 20 constitutes a second module, and that each parallel motion mechanism 18 (and the associated probe holder 17) constitutes a further module. This allows for rapid assembly, dismantling and/or conversion for different types of testing operations and/or for testing of different types of workpieces. The mass of oscillating parts (11, 17, 18) is a fraction of the mass of parts (including the carriage) which oscillate in conventional testing apparatus. Therefore, the inertia of oscillating parts is low so that they can be moved at a high frequency to thus allow for the transport of workpieces at a high speed. The bearings, tracks, rollers and similar parts which move or serve to guide the moving elements are subjected to less pronounced wear than in conventional apparatus so that the improved apparatus requires less maintenance and can stand long periods of uninterrupted or intermittent use. Moreover, the repair work is simple since the module or modules having defective components can be readily separated from satisfactory modules. The support 11 protects the sensitive parts (especially the probes) against excessive stresses, strong impacts and other undesirable influences.

The weights 25 prevent or reduce the likelihood of vibrations or other stray movements which, in turn, allows for further increases in the frequency of oscillatory movement of probe holders 17.

The toggle mechanism including the links or arms 13, 13a enhances the stability of the support 11, and the gears 14 insure that the orientation of the support remains unchanged irrespective of the axial position of the piston rod 12a. The likelihood of misorientation can be reduced still further by providing mating gears at the lower ends of the links 13. The rod-like guides 15 can be used in addition to or as a substitute for the toggle mechanism.

FIGS. 4, 5a and 5b show a portion of a second ultrasonic testing apparatus. The manner in which the carriage 6 is movable transversely of the path for sheets 1 (i.e., at right angles to the direction indicated by arrow 2 in FIG. 4) is preferably the same as described in connection with FIGS. 1–3b. The carriage 6 includes an extension or arm 29 for a horizontal pintle 28 pivotably mounting the rear portion of a trough-shaped support 27. The arm 29 is parallel to the direction of lengthwise movement of sheets 1. The front portion of the support 27 supports five equally spaced testing devices or probe holders 17 each of which is mounted on a parallel motion mechanism 18 including a biasing means 19. The motor 16 of the means for oscillating the probe holders 17 at right angles to the direction of movement of a sheet 1 is mounted in the support 27.

The means for moving the front portion of the support 27 (and the probe holders 17) up or down, i.e., for pivoting the support 27 about the axis of the pintle 28, comprises a fluid-operated cylinder-and-piston unit whose piston rod 30a is articulately connected to the support and whose cylinder 30 is articulately connected to the carriage 6. The means for regulating the flow of a pressurized hydraulic or pneumatic fluid to the chambers of the cylinder 30 is designed to move the piston rod 30a in several stages including a relatively short displacement which causes the support 27 to lift the probe holders 17 slightly above the sheet 1 therebelow, a rapid displacement which causes the support 27 to move the probes 17 to their operative positions of engagement with a sheet 1 therebelow, and a further displacement which causes the support 27 to pivot the probe holders 17 from operative positions and all the way to their fully raised inoperative positions.

The resetting means for the support 27 comprises a cable or cord 31 the lower end of which is attached to the front portion of the support and the upper end of which is attached to a strong helical spring 33 secured to the rear end of the arm 29. The cable or cord 31 is trained over an idler roll 32 which is mounted at the front end of the arm 29. The just described resetting means performs the function of springs 26 shown in FIG. 2, i.e., it lifts the probe holders 17 above and away from the path for sheets 1 in the event of malfunctioning of the jack 30, 30a.

The plate 20 of FIGS. 1–3b is replaced by a carrier in the form of a slide 34 which is reciprocable along horizontal ways 35 located at the front end of the support 27. The ways 35 are provided in a frame-like insert 36 which can be introduced into or removed from the front portion of the support 27 so that all of the probe holders 17 (with the associated parallel motion mechanisms 18) can be attached or removed as a unit. The insert 36 has a partition 37 which is located behind the slide 34. The rear side of the partition 37 mounts a reciprocable balancing weight or counterweight 38. When the motor 16 causes the probe holders 17 to move in a direction to the right, as viewed in FIG. 5b, the counterweight 38 is moved in a direction to the left, or vice versa. The slide 34 is reciprocated by a first crank drive 39 and the weight 38 is reciprocated by a second crank drive 40. A shaft 41 for the crank drives 39, 40 is mounted in antifriction bearings provided therefor in the partition 37 of the insert 36. The throw of each of the crank drives 39, 40 is preferably adjustable between an infinite number of values; such adjustments can be performed in response to actuation of knobs, bolts and corresponding holes or slots or the like (not shown) which are accessible in each position of the support 27. Since the slide 34 and the weight 38 reciprocate in horizontal planes, a single adjustment of the weight 38 suffices to properly balance the forces which develop during operation of the motor 16. Once the forces are properly balanced, the apparatus will operate satisfactorily irrespective of the selected amplitude and/or frequency of oscillatory movement of the slide 34 and probe holders 17 at right angles to the direction of lengthwise movement of sheets 1 therebelow.

The insert 36 constitutes with the parts which are mounted thereon a preassembled module which can be inserted into or withdrawn from the support 27. The testing apparatus can be furnished with two or more modules which can be used interchangeably, depending on the width, thickness and/or other parameters of the material to be tested and/or on the nature of testing operation. In order to permit for rapid and convenient removal or insertion of a module, the shaft 41 in the partition 37 can be coupled to the output shaft of the motor 16 by means of a suitable coupling 42 (FIGS. 4 and 5b). The support 27 is provided with locating means or stops 43 against which a properly mounted insert 36 abuts. The means for separably securing a selected insert 36 to the support 27 may comprise screws, bolts or analogous fasteners, not shown.

The front portion of the support 27 carries at its underside a detector 44 which monitors the path for sheets 1 and serves to produce a signal in response to detection of the leader of an oncoming sheet. A second detector 45 carried by a linkage 46 and which monitors the path for sheets 1 is designed to produce a signal in response to detection of the trailing end of a sheet. For example, the detector 45 can descend behind the trailing end of a sheet 1 and a signal generated thereby actuates the valve means for the cylinder 30 in order to pivot the support 27 counterclockwise, as viewed in FIG. 4. An analogous operative connection by signals and valve means can be provided to respond to a displacement of the detector 44 by the leader of an oncoming sheet 1 and to cause the jack 30, 30a to pivot the support 27 to the operative position of FIG. 4.

Each of the parallel motion mechanisms 18 is preferably detachable from, shiftable along and/or otherwise adjustable relative to the slide 34. Also, each probe holder 17 is preferably detachable from the respective parallel motion mechanism 18 to thereby further enhance the versatility of the testing apparatus. The number of probe holders 17 on the slide 34 can be increased or reduced.

When the probe holders 17 are contacted by a sheet 1 having an uneven upper surface, the parallel motion mechanisms 18 enable the probe holders 17 to follow the uneven outline of the sheet while the slide 34 moves back and forth at right angles to the direction of lengthwise movement of the sheet. In fact, the entire support 27 can pivot in response to contact between the probes and the uneven upper side of a workpiece to be tested. As a rule, the sheets 1 will be guided for travel in a horizontal plane.

The apparatus of FIGS. 4-5b also exhibits the important advantages of the first apparatus, such as modular construction, the capability of probe holders 17 to oscillate at a high frequency without any (or without appreciable) stray movements, shielding of probes against excessive stresses, yieldability of the support 27 in response to engagement with oncoming leaders and/or protuberances of workpieces, and reliable suspension of the support on the carriage. The apparatus of FIGS. 4-5b exhibits the additional advantage that, owing to direct coupling of the support 27 with the arm 29 of the carriage 6 by means of the pintle 28, the toggle mechanism 13, 13a and/or the guides 15 of the first apparatus can be dispensed with.

Another advantage of the second apparatus is that the carrier 34 and weight 38 perform pure translatory movements which further reduces the likelihood of stray movements of the probe or probes. Therefore, the apparatus of FIGS. 4-5b is especially suited for testing of workpieces with one or more probes which must oscillate at extremely high frequencies, e.g., because the stock is being conveyed at an elevated speed.

The feature that the cylinder 30 can cause the piston rod 30a to perform discrete strokes of different length and at different speeds enables the probes to dwell in a position of readiness at a short distance above the path of workpieces and to rapidly descend to their operative positions. On the other hand, and when the apparatus is defective or the workpieces exhibit pronounced protuberances at and/or intermediate their ends, the probes can be rapidly lifted to assume retracted positions at a substantial distance from the path for workpieces.

The coupling 42 allows for rapid detachment of a module including an insert 36. This coupling may include a sleeve on the crank pin for the connecting rod of the drive 40 and a stub on a crank arm 42a which is mounted on the output shaft of the motor. The sleeve can be simply slipped onto or off the stub. Such rudimentary coupling contributes to simplicity, ruggedness and lower cost of the apparatus. Convenient removal or detachment of the discrete parts or groups of parts (modules) is of importance in testing apparatus for metallic sheets or the like because such apparatus are subjected to substantial stresses and their parts undergo considerable wear so that a reduction of the time which is needed to gain access to, to remove and/or to replace defective parts contributes to the output of the testing apparatus and the work can be performed by semi-skilled and in part by unskilled persons.

The crank drives 39, 40 are preferably adjustable as a unit so that the amplitude of oscillatory movement of parallel motion mechanisms 18 and probe holders 17 is changed simultaneously with the amplitude of oscillatory movement of the weight 38.

If the workpiece to be tested is a wide band or sheet, two or more apparatus of the type shown in FIGS. 1-3b or 4-5b can be mounted side-by-side so that the probes can test the entire sheet or band. Two or more testing apparatus can be installed in such a way that their probes form a single row, as considered at right angles to the direction of transport of workpieces, or the probes of neighboring apparatus can be staggered with respect to each other, as considered in the direction of lengthwise movement of the workpieces. The provision of two or more apparatus for the testing of wide workpieces is desirable because each probe is then required to monitor a relatively narrow strip of a workpiece, i.e., the amplitude of oscillatory movement of probes can be reduced proportionally with the number of testing apparatus.

FIGS. 6 to 8 show the details of a parallel motion mechanism 18. Each such mechanism includes a plate-like mounting member 50 having lugs for two pivot pins 55, 56 which carry parallel links 51, 53. As shown in FIG. 6, the lower link 51 has two parallel sections 58, 59 located in vertical planes and connected to each other by two traverses 60 and 61. The sections 58, 59 further carry a sheet metal deflector or ramp 63 which extends between the traverses 60, 61. The underside of the deflector 63 is denoted by the reference character 65. The parts 58, 59, 60, 61 and 63 of the link 51 are welded to each other.

The outer ends of the sections 58, 59 support the end portions of a shaft 67 for a frame-like support or yoke 70 pivotally mounting the respective probe holder 17. The support 70 includes an upwardly projecting extension 71 which is articulately connected to the outer end of the link 53 by a shaft 73. The link 53 is disposed between the sections 58, 59 of the lower link 51.

The support 70 further carries two runners or followers 75, 76 which are secured thereto by screws 77. The runners 75, 76 have surfaces 79, 80 which are inclined in a manner shown in FIG. 7, i.e., transversely of the direction of lengthwise movement of a sheet 1 below the illustrated probe holder 17. The surfaces 79, 80 slope downwardly and inwardly, i.e., downwardly and toward the probe holder 17 between the runners 75, 76.

The runners 75, 76 are further formed with second surfaces 83, 84. The inclination of surfaces 83, 84 is similar to that of the surface 65 on the deflector 63 (see FIG. 8). Each of the runners 75, 76 is made of sheet metal pieces which are preferably welded to each other. Any protuberance on a workpiece which is moved in the direction indicated by arrow 2 engages the surface 65 and/or the surfaces 83, 84 before it reaches the probe holder 17. This insures that the protuberance cannot strike against and eventually damage the probe.

The surfaces 79, 80 render it possible to move the probe holder 17 sideways over the marginal portion or portions of a workpiece whereby the runner 75 or 76 raises the probe holder and reduces the likelihood of damage. It is often sufficient to provide the frame 70 with a single runner 75 or 76, e.g., when the probe holder 17 need not be moved across the full width of a workpiece.

Without further analysis, the foregoing will so fully reveal the gist of the present invention that others can by applying current knowledge readily adapt it for various applications without omitting features which fairly constitute essential characteristics of the generic or specific aspects of our contribution to the art and, therefore, such adaptations should and are intended to be comprehended within the meaning and range of equivalence of the claims.

What is claimed as new and desired to be protected by letters Patent is set forth in the appended claims:

1. Apparatus for ultrasonic testing of metallic sheets, bands or analogous workpieces which are transported in a predetermined direction along a predetermined path comprising a frame; a carriage mounted in and movable relative to said frame transversely of said path; a support; a displacing device connecting said carriage with said support and arranged to move at least a portion of said support toward and away from said path; at least one linkage movably mounted on said support; a probe holder mounted on said linkage; and means for oscillating said linkage and said probe holder with respect to said support substantially transversely of said path.

2. Apparatus as defined in claim 1, wherein said linkage is a parallel motion mechanism and said support is shaped as a deflecting trough.

3. Apparatus as defined in claim 1, further comprising motor means for moving said carriage relative to said frame.

4. Apparatus as defined in claim 1, wherein said displacing means is arranged to move said portion of said support to and from a predetermined position in which said probe holder is immediately adjacent to a workpiece in said path, and further comprising means for biasing said linkage so as to yieldably urge said probe holder against a workpiece in said path in said predetermined position of said support.

5. Apparatus as defined in claim 4, wherein said support comprises a deflector which is closely adjacent to said path in said predetermined position thereof so as to be engaged by eventual protuberances of a workpiece in said path.

6. Apparatus as defined in claim 5, wherein said path is substantially horizontal and said support, said linkage, said displacing means and said probe holder are located above said path.

7. Apparatus as defined in claim 1, wherein said oscillating means comprises a motor mounted on said support and having a rotary output element, at least one drive connecting said output element with said linkage, and at least one counterweight for balancing the mass of said linkage and said probe holder when said motor actuates said drive.

8. Apparatus as defined in claim 7, further comprising a carrier for said linkage, said carrier being oscillatable by said drive and said counterweight being movable by said motor substantially counter to the direction of movement of said carrier relative to said support.

9. Apparatus as defined in claim 1, wherein said path is substantially horizontal and is located below said probe holder, said displacing means comprising at least one substantially vertical fluid-operated cylinder and piston assembly having first and second portions movable relative to each other and respectively connected to said carriage and said support.

10. Apparatus as defined in claim 9, wherein said support is mounted exclusively on and is movable in its entirety with said second portion of said assembly.

11. Apparatus as defined in claim 10, further comprising means for holding said support against changes in orientation with respect to said carriage in all positions of said second portion of said assembly.

12. Apparatus as defined in claim 11, wherein said holding means comprises a toggle mechanism having portions articulately connected to each other, to said support and to said carriage.

13. Apparatus as defined in claim 12, wherein said portions of said toggle mechanism include two links connected to said carriage or to said support and having mating gears.

14. Apparatus as defined in claim 1, wherein said support is trough-shaped and further comprising a plate-like carrier extending transversely of said path and movably supported by said support, said linkage being mounted on said carrier and said oscillating means being arranged to move said linkage through the medium of said carrier.

15. Apparatus as defined in claim 14, wherein said trough-shaped support has an open front end facing in the direction of movement of workpieces along said path and said carrier is adjacent to said front end.

16. Apparatus as defined in claim 14, wherein said support comprises at least one tie rod extending transversely of said path and said carrier has at least one sleeve slidable along said tie rod in response to actuation of said oscillating means.

17. Apparatus as defined in claim 1, wherein said oscillating means comprises a motor mounted on said support and having a rotary output element, and a crank drive connecting said output element with said linkage.

18. Apparatus as defined in claim 17, wherein said crank drive comprises a first gear driven by said output element, a second gear mating with said first gear, a connecting rod eccentrically secured to one of said gears and operatively connected with said linkage, and balancing weights provided on said gears, said balancing weights being arranged to counteract forces acting on said gears at right angles to said path.

19. Apparatus as defined in claim 1, further comprising a hinge connecting a second portion of said support to said carriage for pivotal movement about an axis which extends transversely of and is parallel to said path, said displacing means comprising a cylinder and piston assembly arranged to pivot said support about said axis so as to move said first mentioned portion of said support nearer to and away from said path.

20. Apparatus as defined in claim 19, wherein said oscillating means comprises a carrier mounted on said first mentioned portion of said support in parallelism with said axis and means for moving said carrier, said linkage being mounted on said carrier.

21. Apparatus as defined in claim 20, further comprising an insert removably installed in said first mentioned portion of said support, said carrier being mounted on and being movable relative to said insert.

22. Apparatus as defined in claim 21, wherein said means for moving said carrier comprises a motor mounted on said support and having a rotary output element, and a crank drive connecting said output element with said carrier.

23. Apparatus as defined in claim 22, further comprising a balancing weight for said carrier and a second crank drive receiving motion from said output element and arranged to oscillate said weight, said weight being mounted on and being movable relative to said insert in parallelism with said axis.

24. Apparatus as defined in claim 19, wherein said assembly comprises a first portion connected to said carriage and a second portion reciprocable relative to said first portion and connected to said support, said second portion of said assembly being movable between a plurality of positions including first, second and third positions in which said probe holder respectively engages with, is closely adjacent to and is distant from a workpiece in said path.

25. Apparatus as defined in claim 19, wherein said carriage includes an elongated arm having an end portion remote from said assembly and said hinge connects said second portion of said support to said end portion of said arm, said arm being substantially parallel to said direction.

26. Apparatus as defined in claim 1, further comprising an insert separably mounted on said support and a carrier mounted on and movable relative to said insert transversely of said path, said linkage being mounted on said carrier and said oscillating means comprising a motor mounted on said support and a drive receiving motion from said motor and arranged to move said carrier and said linkage relative to said insert.

27. Apparatus as defined in claim 26, wherein said insert comprises a partition extending transversely of said path, said carrier being adjacent to one side of said partition and further comprising a counterweight mounted on said insert at the other side of said partition and being movable transversely of said path, and a second drive receiving motion from said motor and arranged to move said counterweight so that the latter moves in one direction while said carrier moves in the opposite direction, and vice versa.

28. Apparatus as defined in claim 27, further comprising a shaft rotatably mounted in said partition, said first mentioned drive receiving motion from said shaft and said second drive having means for rotating said shaft.

29. Apparatus as defined in claim 27, wherein said motor comprises a rotary output element and further comprising means for separably coupling said drives to said output element so that said insert with said drives, said carrier, said linkage and said probe can be separated from said support in response to disengagement of said coupling means.

30. Apparatus as defined in claim 1, further comprising means for biasing said support in a direction away from said path.

31. Apparatus as defined in claim 1, further comprising detector means arranged to monitor said path for the leaders of workpieces and including means for actuating said displacing means so as to move said support toward said path in response to detection of a leader.

32. Apparatus as defined in claim 1, further comprising detector means arranged to monitor said path for the trailing ends of workpieces and having means for actuating said displacing means so as to move said support away from said path in response to detection of a trailing end.

33. Apparatus as defined in claim 1, further comprising means for adjusting said oscillating means so as to change the amplitude of oscillatory movement of said linkage.

34. Apparatus as defined in claim 1, wherein said linkage comprises a parallel motion mechanism having two links one of which is nearer to said path than the other thereof, said one link having a deflector one side of which faces said path, said side of said one link sloping toward said path as considered in said predetermined direction.

35. Apparatus as defined in claim 1, further comprising at least one deflecting runner provided on said linkage adjacent to said probe holder and arranged to engage a workpiece in said path.

36. Apparatus as defined in claim 35, wherein said runner has a surface facing a workpiece in said path and sloping toward said path as considered in the direction of oscillatory movement of said linkage.

37. Apparatus as defined in claim 36, wherein said runner has a second surface facing a workpiece in said path and sloping toward said path as considered in said predetermined direction.

\* \* \* \* \*